United States Patent [19]

Abuaf et al.

[11] Patent Number: 4,798,753
[45] Date of Patent: Jan. 17, 1989

[54] INSULATING PANELS CONTAINING INSULATING POWDERS AND INSULATING GASES

[75] Inventors: Nesim Abuaf, Schenectady, N.Y.; Robert W. Barito; Kenneth L. Downs, both of Louisville, Ky.

[73] Assignee: General Electric Company, Louisville, Ky.

[21] Appl. No.: 157,156

[22] Filed: Feb. 11, 1988

Related U.S. Application Data

[63] Continuation of Ser. No. 943,737, Dec. 19, 1986, abandoned.

[51] Int. Cl.$^4$ .............................. B32B 1/02; B32B 9/00
[52] U.S. Cl. ........................................... 428/69; 428/76
[58] Field of Search ..................................... 428/69, 76

[56] References Cited

U.S. PATENT DOCUMENTS

| | | | |
|---|---|---|---|
| 2,067,015 | 1/1937 | Munters | 428/69 |
| 4,159,359 | 6/1979 | Pelloux-Gervais et al. | 428/76 |
| 4,636,415 | 1/1987 | Barito et al. | 428/76 X |
| 4,681,788 | 7/1987 | Barito et al. | 428/68 |

Primary Examiner—Alexander S. Thomas
Attorney, Agent, or Firm—Frederick P. Weidner; Radford M. Reams

[57] ABSTRACT

Insulating panels are formed from compressed particulate material impregnated with insulating gases, the combination being held in a gas tight pouch. These pouches can be placed in the insulation space of a structure where insulation is to be provided and, if desired, encapsulated in a foamed insulating material. Among the possible particulate materials is precipitated silica, while various Freon gases can be employed as the insulating gas.

5 Claims, 6 Drawing Sheets

INSULATING PANELS CONTAINING INSULATING POWDERS AND INSULATING GASES

This application is a continuation, of application Ser. No. 943,737, filed 12/19/86 now abandoned.

BACKGROUND OF THE INVENTION

The design and development of thermal insulating materials, is an extensive art. Many systems have been developed employing, as the major insulating materials, various fibrous and powder products. There have also been a variety of ways for utilizing these materials, including the use of evacuated shells and bags, compression of the insulating materials, and varying orientations of the insulating materials.

In U.S. Pat. No. 4,636,415 entitled "Precipitated Silica Insulation," assigned to the same asignee as the present invention, the use of precipitated silica as an insulator to achieve good insulating properties at relatively low cost has been described. The precipitated silica, in accordance with that application, is dried at a temperature sufficient to drive off the surface water, is then compressed, placed in a gas and water tight envelope which is evacuated, and the gas and water tight pouch then sealed.

Additionally, in U.S. Pat. No. 4,681,788 entitled "Insulation Formed of Precipitated Silica and Fly Ash," assigned to the same assignee as the present invention, the use of such precipitated silica in combination with fly ash and fly ask-like materials is described. This combination of materials is employed in the same manner as the precipitated silica, alone, i.e., it is compressed, placed in a gas and water tight envelope which is evacuated, and the gas and water tight envelope then sealed.

While each of the systems just described forms a more than adequate insulating material, it would be extremely desirable to form insulation having the same ostensible structure, but where evacuation and maintenance of a vacuum at the extremely low levels required would not be necessary. By this invention, a system has been developed using the materials described in the referenced copending applications, as well as other particulate materials, but with added components, providing the same isulating properties without the necessity for the extremely low vacuums.

THE PRIOR ART

While the prior art has described insulating panels in conjunction with insulating gases, such as Freons and other materials having a heat conductivity lower than that of air, this discussion has generally involved ways to avoid combining such insulating gases with particulate insulators, or the use of such insulating gases with other insulating materials.

For example, in U.S. Pat. No. 4,492,725, Ishihara, et al, a particulate material, at least a portion of which must be activated carbon, is enclosed within a plastic film. This plastic film is at least partially surrounded by an expanded plastic foam, the expansion of the foam generally being accomplished with a material such as Freon. The purpose of the activated carbon is to absorb any of the Freon gas which may leak through the plastic film, since, according to that patent, leakage of the Freon gas into the particulate material increases the internal pressure and also causes a rise in the heat conductivity.

U.S. Pat. Nos. 3,004,877, Simms et al, and 3,027,753, Harder, Jr., each assigned to the same assignee as the present invention, describe the use of insulating panels formed of a soft, fibrous batt enclosed in an essentially gas tight envelope, where the envelope also contains a gas having a coefficient of thermal conductivity lower than that of air. There is, however, no suggestion of employing any particulate material in such an insulating system.

In fact, except for fumed silica, applicant is unaware of any disclosure which might suggest the incorporation of a gas with an insulating value lower than that of air in combination with a particulate material. The combination of a gas, such as Freon, is described in U.S. Pat. No. 4,159,359 in combination with fumed silica. However, that patent specifically discounts the possibility of employing a silica, other than fumed silica, in an insulation system.

Thus, based upon the prior art known to applicant, one skilled in the art would expect that with a particulate silica insulator, when that insulator is incorporated into a gas impermeable envelope, the envelope must be evacuated, and the vacuum maintained, in order for the device to adequately function as an insulator.

BRIEF DESCRIPTION OF THE INVENTION

In accordance with the present invention, it has unexpectedly been discovered that the incorporation of a gas having a coefficient of thermal conductivity lower than air, particularly a Freon gas, with certain particulate insulating materials, results in an insulating panel having a coefficient of thermal conductivity which is lower, at all equivalent vacuum levels, than when air is employed, and without the necessity for complete evacuation of the envelope enclosing the insulating material.

The particulate insulating material useful in accordance with the present invention include the precipitated silica set forth in the afore-referenced U.S. Pat. No. 4,636,415 the combination of precipitated silica with fly ash and fly ash-like materials, as set forth in previously referenced U.S. Pat. No. 4,681,788; perlite; and blends of fumed silica and fly ash and fly ash like materials. The gas employed to impregnate and fill the voids between the particles of these particulate insulation materials is one which has a coefficient of thermal conductivity lower than that of air, particularly a material such as one of the Freons, more particularly, Freon 11 or Freon 12.

In accordance with the present invention, it has been found that even when the insulating panels are formed with internal pressures of between 10 mm. Hg, absolute, and atmospheric, more than adequate K factors of from about 0.03 to 0.22 BTU-IN/HR. $FT^2°F.$, are obtained.

To form the insulating panels of the present invention, the particulate insulating material to be used is heated to drive off surface water. Frequently, it is found that this drying operation is best carried out in a microporous pouch, merely to provide containment during processing.

Subsequent to drying of the particulate insulating material, it is placed into an envelope, the construction of which is designed to prevent gas leakage and/or permeation. In the preferred embodiment, the envelope is then evacuated, flushed with the insulating gas, evacuated to the desired pressure, and sealed. If the particulate insulating material has been dried in a microporous pouch, the microporous pouch can be placed directly into the gas barrier envelope. Either before, or during, evacuation of the envelope, the particulate insulating material is subjected to compression to provide a desired density which allows for superior insulation with a sufficiently thin construction. After compression and evacuation, the gas barrier envelopes containing the compressed particulate insulating material are in, essentially, a board like form, so that they can easily be placed into the structure where insulation is to be provided. Under these circumstances, the panels may be used alone or they can be attached to a surface, such as by adhesive, where thermal insulation is desired. If desired, foamed-in-place insulation, such as polyurethane foam, can be added to the insulation space to surround and embed the panels formed of the particulate insulating material. One method which has been employed is attachment of the panels to the walls of the insulation space by means of foam spacer blocks, which results in complete encapsulation of the panels by the foamed-in-place insulation.

After formation of the insulating panels in accordance with the present invention, they can be subject to testing to make certain that the gas placed in the pouch is not leaking. Particularly in the case of Freon impregnated insulating materials, a halogen detector is employed.

DESCRIPTION OF THE PREFERRED EMBODIMENTS

The procedure employed in accordance with the present invention for formation of the insulating panels is generally the same as that set forth in the previously referenced U.S. Pat. No. 4,681,788. If a mixture of materials, such as silica and fly ash or fly ash-like materials, is to be employed, these materials are first thoroughly blended. this blend, or in the case of other particulate materials, such as perlite or precipitated silica, alone, is then placed in an essentially air and water-tight pouch where it is subjected to pressure, evacuation, and gas flush, to form a material of board-like consistency. This material is generally from one-half to one inch in thickness and is flat. The length and width of the panel which results from the treatment is limited only by the size of the piece of equipment, such as a freezer or refrigerator, in which it is to be inserted.

In forming the insulating panels of the present invention, the particulate material is first dried. If desired, the particulate material may be placed in a microporous pouch, the pouch merely used as an aid in holding the powdery particulate material during the drying operation. If it is desired to use such a microporous material, among the materials which can be employed is a polypropylene, sold by Celanese under the name "Celgard." Additionally, the types of paper used as filter paper can be employed. In general, any material which allows the passage of air and moisture, but holds the finely divided particulate mixture can be used.

In the drying operation, whether or not the microporous pouch is employed, the temperature should be sufficient to drive off the surface water. Generally, this means, when a microporous pouch is employed, a temperature of approximately 100° C., the upper limit being one at which the microporous material will not char, melt, or degrade.

Subsequent to the drying operation, the dry particulate material is pressed to form a cake. When a mixture of precipitated silica and fly ash is employed, the density of this cake is from about 10 to 35 pounds per cubic foot, preferably, 10 to 25 pounds per cubic foot. The densities of the other particulate materials are as known to those skilled in the art.

The dried, pressed particulate material is then placed into a further, gas-barrier pouch, this pouch being formed in such a way as to prevent gas leakage. If the particulate material has been dried in a microporous pouch, the microporous pouch is merely placed into the gas barrier envelope. In general, gas leakage is prevented in the evelope through use of a barrier film consisting of one or more layers of polymeric, metallized polymeric, or metal foil laminas. For example, a type of envelope which has been found useful in accordance with the present invention is one formed from five layers of a polymer, including four polyester layers metallized on five surfaces to provide a gas barrier, and one polymeric, heat-sealable, inner layer.

The overall thickness of the envelope should be small enough that there is little conduction of heat through the edges. In general, the overall thickness should be from approximately 0.003 to 0.020 inch. While the thinner materials provide sufficient strength to hold the particulate material and allow the further processing necessry, the life expectancy of the apparatus into which they are placed may be reduced. However, life expectancies of five years, and more, can be expected even with the 0.003 inch thickness envelope.

The gas barrier envelope which is employed in accordance with the present invention has an adaptor valve, or other opening, permitting the evacuation of the bag and the refilling of that bag with the high molecular weight gases or Freons in accordance with the present invention. The bag is first evacuated to as a low a pressure as desired, e.g., a few microns of mercury, and is then filled with the high molecular weight gas or Freon to the pressure desired. The evacuation and gas filling cycle can be repeated so as to assure a low air partial pressure remaining in the panel. The manufacturing process is then terminated by heat sealing the gas barrier envelope to close the evacuation path.

In general, any of the particulate heat insulating materials known to the art can be employed in accordance with the present invention. Preferably, such particulate materials include precipitated silica, mixtures of precipitated silica with fly ash, mixtures of fumed silica with fly ash, and perlite. When fly ash is blended with either precipitated or fumed silica, the amount of fly ash material present is between 30 and 70% of the total of particulate material, preferably between 40 and 60%. With any of the particulate materials, the median particle size of the particulate material is preferably under 100 microns. The fly ash material, as defined in the referenced U.S. Pat. No. 4,681,788, preferably has a combined total of silica, aluminum oxide, and ferric oxide of at least 40% and less than 10% magnesium oxide. Most preferably, the combined total of silica, aluminum oxide, and ferric oxide in the fly ash material is greater than 80% and the magnesium oxide total is less than 5%.

The gases which can be employed in accordance with the present invention are generally those having a high molecular weight and a heat conductivity less than that of air. Included among this group are krypton, xenon, and the Freons. Particularly preferred are Freon 12 ($CCl_2F_2$) and Freon 11 ($CFCl_3$).

The pressures within the insulating panels can be up to atmospheric, preferably from about 10 mm. Hg to 100 mm. Hg.

Experiments were carried out with various particulate materials in accordance with the present invention and employing gases in accordance with the present invention. The thermal conductivities of the resulting insulating panels were compared with comparable panels containing air, rather than the referenced low thermal conductivity gas.

Figure 3:
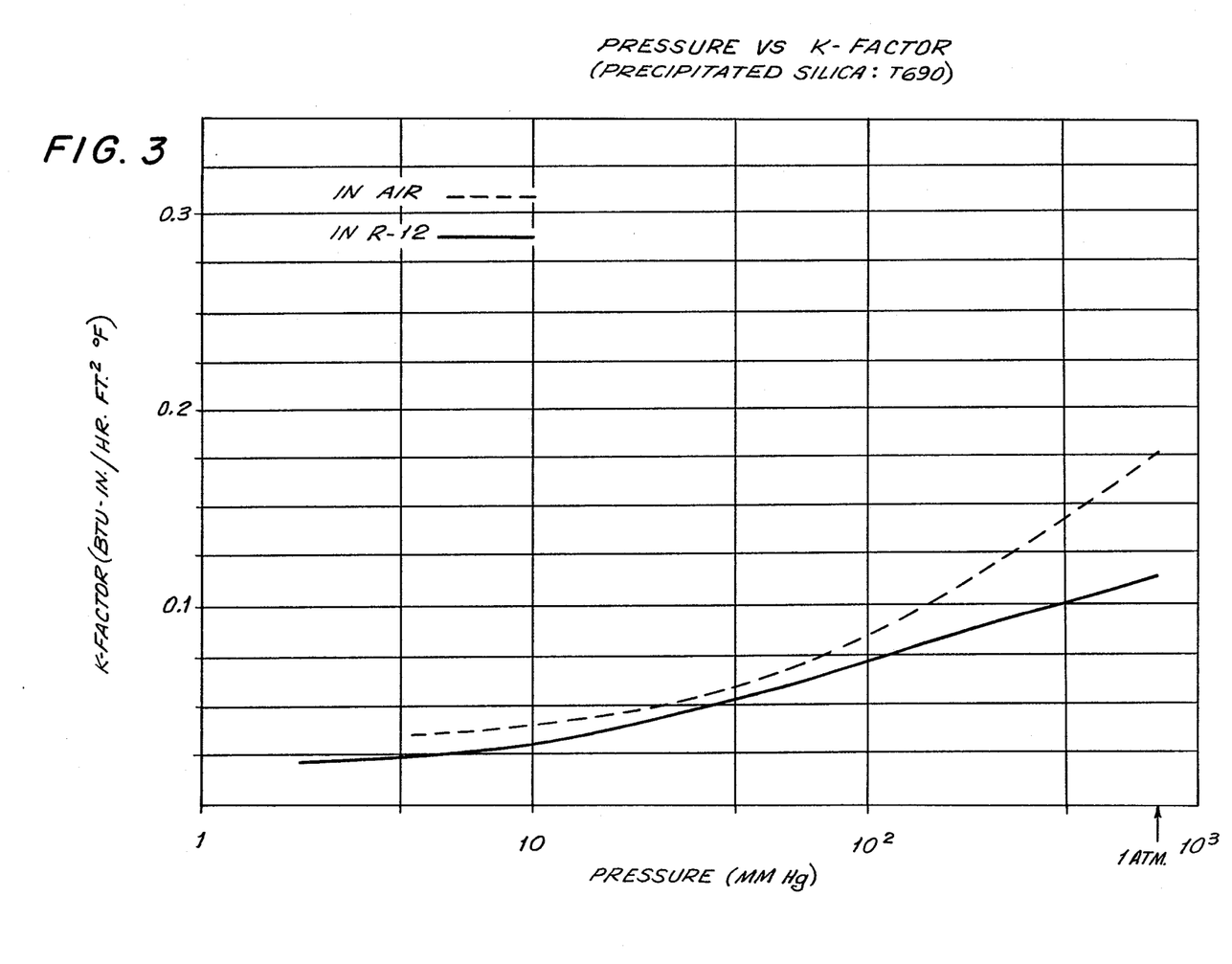
FIG. 3 is a graph showing the K factor of an insulating panel in accordance with the present invention, employing precipitated silica, and comparing the K values with air and Freon.

FIG. 3 illustrates the use of Freon 12 with a precipitated silica sold by PPG under the designation T-690. This T-690 precipitated silica had a surface area of 150 $m^2/g$ by the BET method, a median agglomerate size of 1.3 microns, a tapped density of 4 Lbs/Ft$^3$, a pH of 7, and a DBP absorption of 150. The precipitated silica was compressed to a density of 11.5 Lbs/Ft$^3$ and two evacuation and fill cycles were carried out. The comparison of the resulting K values, as shown in FIG. 3, indicates that, with the Freon filling, the panels had a K factor of approximately 0.030 at 10 mm. and of approximately 0.115 at one atmosphere, compared to a K factor, in air, of approximately 0.040 at 10 mm. and 0.175 at atmospheric pressure.

Figure 4:
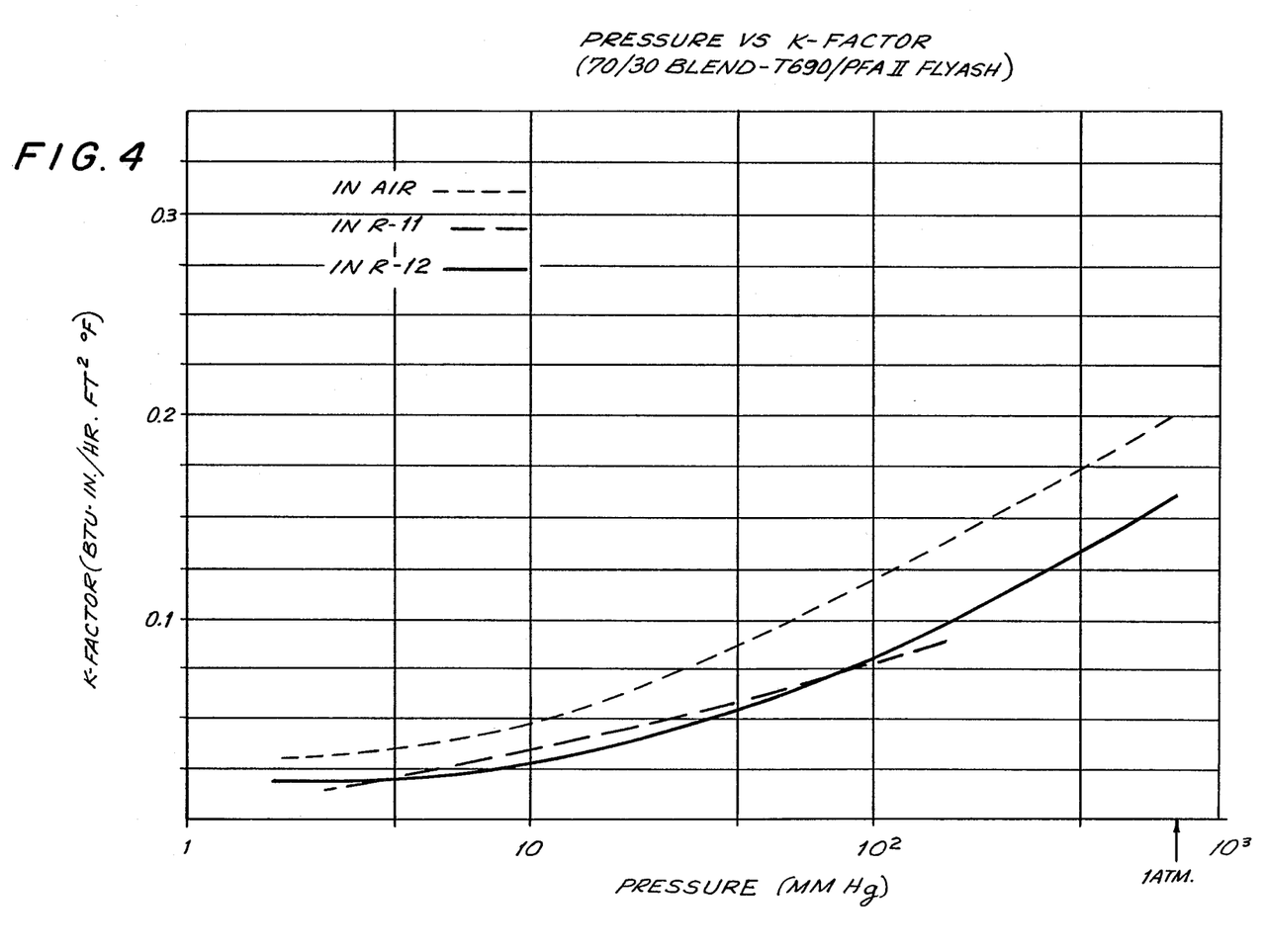
FIG. 4 is a graph showing the K factor of an insulating panel in accordance with the present invention, employing a mixture of precipitated silica and fly ash in a 70/30 ratio, and comparing the K values with air and Freon.

A similar comparison is provided in FIG. 4 where a blend of 70% of the same precipitated silica as referred to in FIG. 3 was blended with 30% of a fly ash material designated as PFA II.

The PFA II had the analysis shown below in Table 1:

TABLE 1

| PROPERTY | WEIGHT PERCENT |
| --- | --- |
| Moisture | 0.31 |
| Ash | 91.47 |
| Volatile Matter | 2.40 |
| Fixed Carbon | 5.80 |
| Loss on ignition | 0.22 |

The elemental analysis of the PFA II fly ash is as shown below in Table 2:

TABLE 2

| CONSTITUENT | WEIGHT PERCENT |
| --- | --- |
| $SiO_2$ | 55.16 |
| $TiO_2$ | 1.86 |
| $Al_2O_3$ | 33.27 |
| $Fe_2O_3$ | 4.87 |
| CaO | 1.01 |
| MgO | 0.84 |
| $K_2O$ | 2.00 |
| $Na_2O$ | 0.54 |
| $P_2O_5$ | 0.19 |
| $SO_3$ | 0.13 |

The blend of precipitated silica and fly ash material, compressed to a density of 14.6 Lbs/Ft$^3$, was placed in gas barrier envelopes which were filled with Freon 11, employing two evacuation/fill cycles and with Freon 12 employing two evacuation/fill cycles. As shown in FIG. 4, employing Freon 12, the insulation panel has a K factor of 0.025 at 10 mm. and 0.16 at one atmosphere, while with Freon 11, the insulation panel had a K factor of approximately 0.035 at 10 mm. By comparison, employing air, in place of either of the Freons, the K factor was approximately 0.045 at 10 mm. and 0.2 at one atmosphere.

Figure 5:
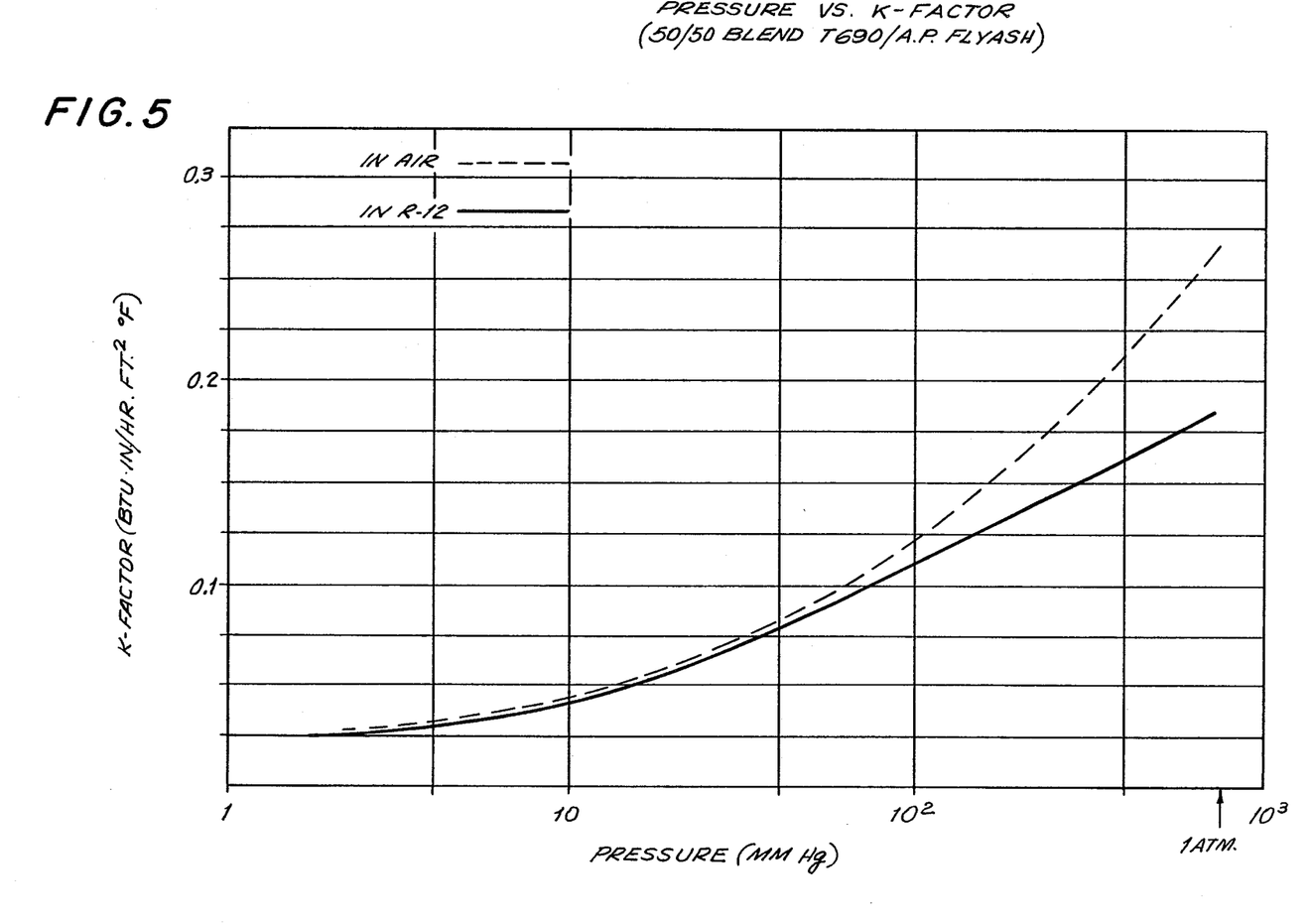
FIG. 5 is a graph showing the K factor of an insulating panel in accordance with the present invention, employing a mixture of precipitated silica and fly ash in a 50/50 ratio, and comparing the K values with air and Freon.

In FIG. 5, a particulate mixture of the same precipitated silicas as defined for FIG. 3, in an amount of 50%, was employed with 50% AP fly ash, which is a fly ash obtained from an inefficient coal fired boiler which is much coarser than the ash designated as PFAII. This mixture was compressed to 22 Lbs/Ft$^3$, placed into a gas barrier envelope, and the gas barrier envelope was filled with Freon 12 in two evacuation/fill cycles. The resulting insulation panel showed a K factor of approximately 0.04 at 10 mm. and 0.175 at one atmosphere, while a corresponding panel with air showed a K factor at 10 mm. of 0.045 and approximately 0.26 at one atmosphere.

Figure 6:
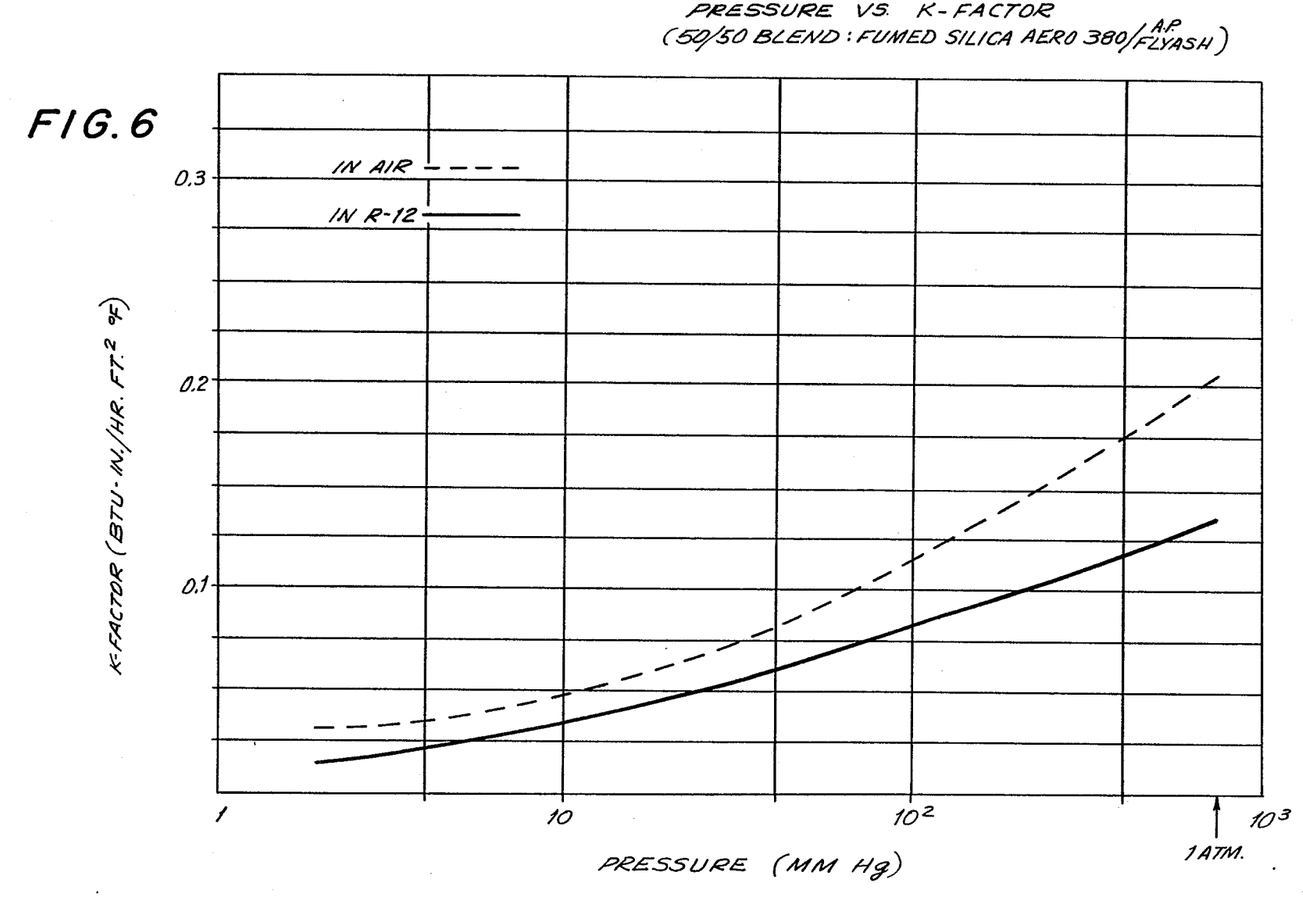
FIG. 6 is a graph showing the K factor of an insulating panel in accordance with the present invention, employing a mixture of fumed silica and fly ash in a 50/50 ratio, and comparing the K values with air and freon.

A similar experiment was carried out and is illustrated in FIG. 6 employing a fumed silica, of the type described in U.S. Pat. No. 4,159,359, in an amount of 50%, blended with 50% AP fly ash compressed to a density of 16.8 Lbs/Ft$^3$. The insulating panels were filled with Freon 12 employing two evacuation/fill cycles. As indicated in FIG. 6, the freon filled panels showed a K factor of approximately 0.03 at 10 mm. and approximately 0.13 at one atmosphere, while the corresponding panels, employing air, showed K factors of approximately 0.045 at 10 mm. and approximately 0.2 at one atmosphere.

Figure 7:
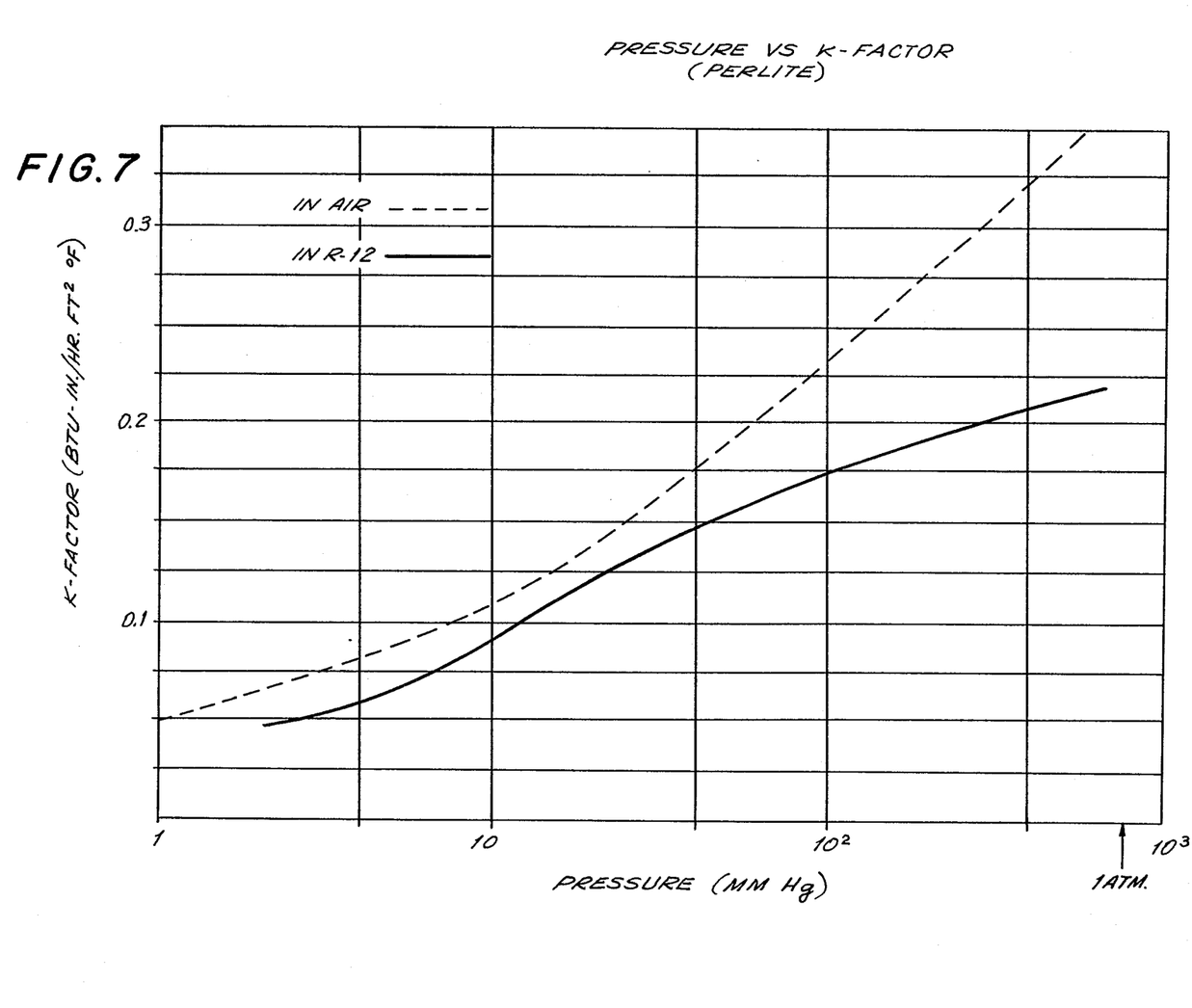
FIG. 7 is a graph showing the K factor of an insulating panel in accordance with the present invention, employing perlite, and comparing the K values with air and Freon.

In FIG. 7, perlite, compressed to a density of approximately 16.9 Lbs/Ft$^3$ was employed and Freon 12 was placed in the gas barrier envelope employing two evacuation/fill cycles. As shown in FIG. 7, the K factor of the Freon filled insulation panels was approximately 0.09 at 10 mm. and approximately 0.215 at one atmosphere, while the corresponding insulation panel, in air, showed a K factor of 0.11 at 10 mm. and over 0.35 at one atmosphere.

Results similar to those set forth above are obtained when the Freon materials are substituted by other high molecular weight, low thermal conductivity gases such as krypton and xenon, and when other precipitated silicas are employed.

Figure 1:
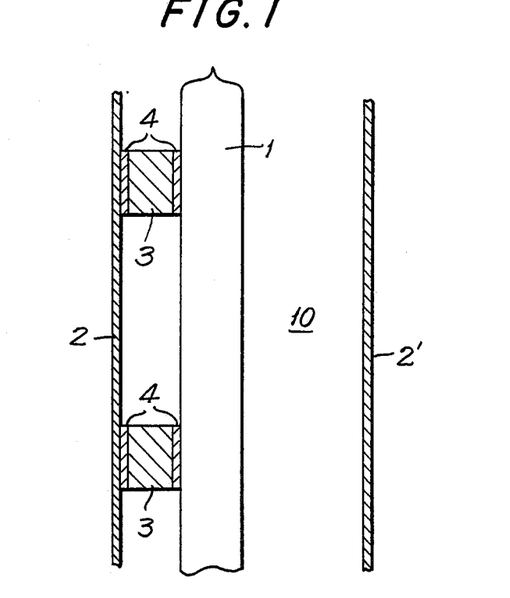
FIG. 1 is a sectional view showing one way of installing an insulating panel in accordance with the present invention within a structure where insulation is to be provided.
Figure 2:
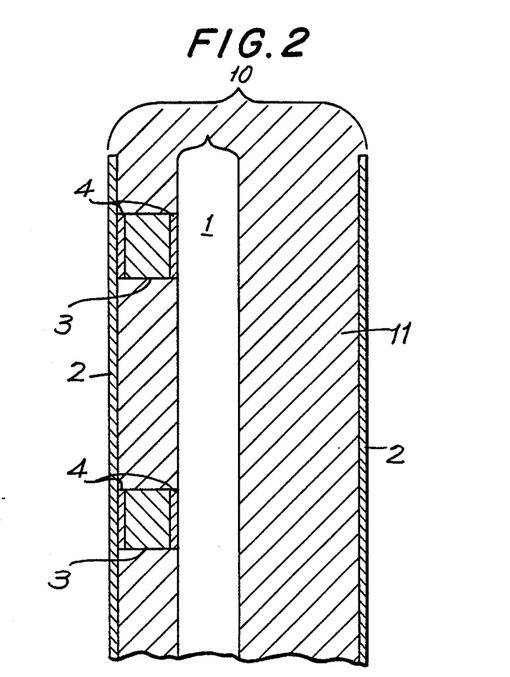
FIG. 2 is a view similar to FIG. 1 wherein the insulating panel of the present invention is embedded in another insulating material.

The thermal insulation material, which is made in accordance with the present invention, may be used in various environments where thermal insulation is needed. As such, it may be suitable as a substitute for fiberglass insulation since it has better thermal insulating qualities. It may be used in place of polyurethane foam and, particularly, in an environment where it is subjected to relatively high temperatures. The envelope or panel containing the material of the present invention may be used to insulate a space by having the panel form part of the walls surrounding the space to be thermally insulated. The panels may also be attached to one or more walls of the space to be insulated, or they may be sandwiched between a double wall which may form the space to be insulated. In the case of refrigerators and freezers, particularly, the space to be insulated is surrounded by a double wall which is commonly referred to as the inner liner and the outer case. One method of employing the insulating panels of the present invention is shown in FIGS. 1 and 2.

As shown in those figures, the insulating panel 1, which is the compressed mixture of the particulate material and gas having a thermal conductivity lower than that of air, within the various envelopes, as set forth above, is attached to the inner surface of the outer case wall 2 by means of foam blocks 3. Adhesive is applied to these foam blocks as at 4 to adhere them both to the inner surface of the outer case wall and to the insulation panel. It will be appreciated that the wall designated as 2 can be either the outer case wall of the inner liner wall. After a sufficient number of insulating panels 1 have been attached to the appropriate wall 2, the space 10, between the two walls, is filled with a foamed in place plastic 11, such as polyurethane foam, which surrounds the panels 1 and blocks 3 and provides a full insulation to the space between the walls 2 and 2'. It will be appreciated that the insulating panels 1 can be attached to either the walls 2 or 2', as desired, without affecting the overall insulating properties of the device. The material which is foamed in place to occupy the space 10 in FIG. 2 can be any of the standard insulating foams employed in this art.

It is important in employing the insulating panels formed in accordance with the present invention to make certain that the insulating gas which has been placed in the panel is not leaking through, due to some defect in the gas barrier envelope or the seal. Particularly when the Freon gases are employed, this can be accomplished with a halogen detector. Generally, the formed panel is tested about three days after completion of processing. A halogen detector, such as a Ferret Halogen detector, is then employed to scan both the heat seals and the surfaces of the panel. The detector is calibrated to $9 \times 10^{-6}$ cc/sec at 24 psig. No detectable fluorocarbon gas should be found.

In accordance with the present invention, the use of a particulate insulating material in combination with a low heat conductivity gas, the two being contained in a gas barrier envelope, as insulating materials for cooling devices has been illustrated. The pressure of the insulating gas can vary over wide ranges while still providing acceptable K values for such cooling devices. Further, since near absolute vacuums are not required with the insulating panels of the present invention, longer life of the insulating panel is obtained. The invention should not be considered as limited to the specific examples, but only as shown and described in the appended claims.

We claim:
1. A slab of material for use as a thermal insulation comprising:
   a. a compressed, particulate insulating material selected from the group consisting of precipitated silica, mixtures of precipitated silica and fly ash materials, said precipitated silica formed by the interaction of an alkaline water glass and a mineral acid to precipitate silica, followed by a drying action to form a dried, finely divided silica;
   b. a gas and water tight envelope surrounding said particulate insulating material; and
   c. an insulating gas within said gas and water tight envelope, said gas impregnating said particulate material.
2. The material of claim 1 wherein the insulating gas is a gas which has a heat conductivity lower than that of air.
3. The material of claim 2 wherein the heat insulating gas is selected from the group consisting of krypton, xenon, and freon.
4. The material of claim 1 wherein the pressure within the gas and water impermeable envelope is up to atmospheric.
5. The material of claim 4 wherein the pressure is from 10 mm. Hg to 100 mm. Hg.

* * * * *

UNITED STATES PATENT AND TRADEMARK OFFICE
CERTIFICATE OF CORRECTION

PATENT NO. : 4,798,753

DATED : Jan. 17, 1989

INVENTOR(S) : Nesim Abuaf, Robert W. Barito, Kenneth L. Downs

It is certified that error appears in the above-identified patent and that said Letters Patent is hereby corrected as shown below:

Claim 1, Col. 8, Line 34, before "material" insert --insulating--.

Signed and Sealed this

Third Day of October, 1989

Attest:

DONALD J. QUIGG

Attesting Officer

Commissioner of Patents and Trademarks